(No Model.)
D. HOUGHTON.
WIRE CUTTING MACHINE.
No. 298,974. Patented May 20, 1884.
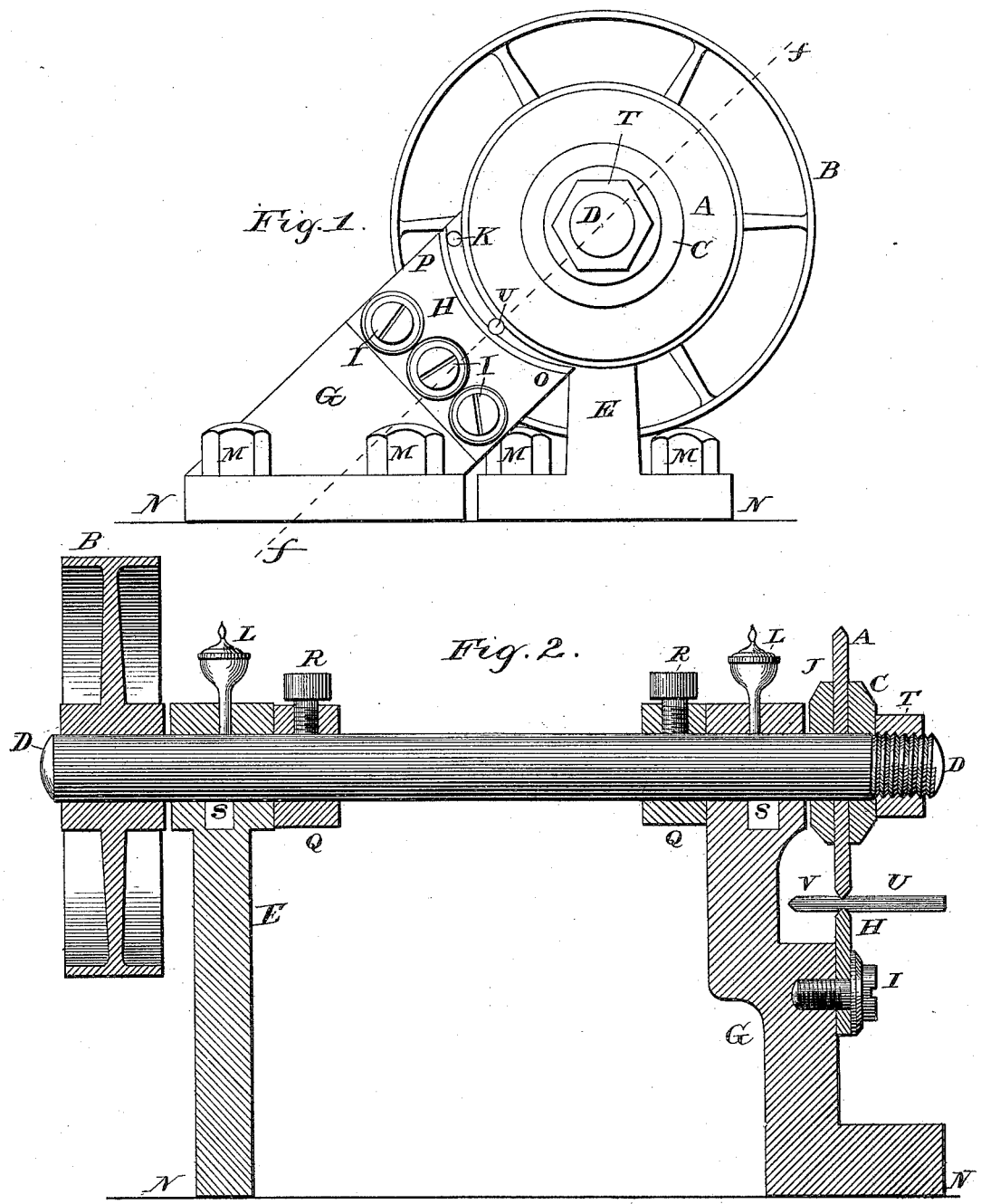
Witnesses:
W. F. Bacon
Winslow Savage
Inventor
Darius Houghton

UNITED STATES PATENT OFFICE.

DARIUS HOUGHTON, OF SKOWHEGAN, MAINE.

WIRE-CUTTING MACHINE.

SPECIFICATION forming part of Letters Patent No. 298,974, dated May 20, 1884.

Application filed November 2, 1883. (No model.)

*To all whom it may concern:*

Be it known that I, DARIUS HOUGHTON, a citizen of the United States, residing at Skowhegan, in the county of Somerset and State of Maine, have invented a new and useful Wire-Cutting Machine, and, according to my knowledge and belief, the same has not been in public use or on sale in the United States for more than two years prior to this application.

The object of my invention is to make a machine by which wire may be cut off into even lengths, having the ends smoothly pointed at any desired angle, or otherwise finished; and it is designed, particularly, for cutting off boot-calks from the wire on the end of which they have been forged, so that the ends when thus cut off will be ready for use without further finishing. I accomplish this object by means of a moving cutter arranged with a stationary cutter in such a way that as the circular cutter moves a tapering or vanishing recess will be formed between the two cutting-edges in which the wire is rolled and cut off.

In the drawings, Figure 1 is a front view of my machine. Fig. 2 is a section through $ff$ of Fig. 1.

N N' is a base or table, to which standards G and E are secured by cap-screws M. In the top of standards G E are journaled bearings S, (shown in Fig. 2,) in which shaft D revolves. Shaft D is driven by belt or pulley B.

A is a round steel cutter, secured to shaft D by collars J and C and nut I with the edge beveled at any desired angle to a point in the center of its thickness, which point is its cutting-edge, and is hardened to suit the metal to be cut.

H is a hardened-steel cutter, secured to standard G by cap-screws I, the lower end, O, being as near as possible to cutter A without touching it, and the upper end, P, being far enough from it to admit the wire between the two cutters. The edge of cutter H is beveled in the same manner as cutter A, and the two edges are adjusted to be precisely opposite each other.

When the machine is to be used, the cutter A is moved about its axis, if now the wire to be cut be placed in the largest end of the tapering space between the two cutters and held perpendicular to their faces, the friction of the moving cutter will force it down the tapering space and roll and cut it off, leaving the ends smoothly pointed. Hitherto such calks, after having been forged on the end of the steel wire, have been sheared off, leaving a rough end, which had to be finished by hand on an emery-wheel.

By the use of my machine this hand-finishing is done away with, the calk being completely finished when it comes from the cutting-machine.

It is evident that the mere shape of the movable cutter, and also that of the stationary cutter, can be changed in a considerable degree and yet allow the formation of a tapering and vanishing recess between their edges; and also that it is not strictly necessary that the movable cutter shall revolve, since a reciprocal or oscillatory motion will more or less perfectly produce the desired results.

I claim—

In a wire-cutting machine, the combination of the moving cutter with a stationary cutter, the two cutters being arranged with their cutting-edges directly opposite each to the other, forming a tapering and vanishing recess between them, substantially as described.

DARIUS HOUGHTON.

Witnesses:
 AMON BAKER,
 W. F. BACON.